United States Patent [19]
Aston

[11] Patent Number: 5,640,843
[45] Date of Patent: Jun. 24, 1997

[54] INTEGRATED ARCJET HAVING A HEAT EXCHANGER AND SUPERSONIC ENERGY RECOVERY CHAMBER

[75] Inventor: Graeme Aston, Monument, Colo.

[73] Assignee: Electric Propulsion Laboratory, Inc. et al., Monument, Colo.

[21] Appl. No.: 401,086

[22] Filed: Mar. 8, 1995

[51] Int. Cl.$^6$ .................................................. B23K 9/00
[52] U.S. Cl. ................................ 60/203.1; 219/121.49; 219/121.51; 313/231.41
[58] Field of Search .................................. 60/200.1, 202, 60/203.1; 219/121.49, 121.51, 121.52, 121.55, 121.56; 313/632, 231.31, 231.41, 231.51

[56] References Cited

U.S. PATENT DOCUMENTS

| | | | |
|---|---|---|---|
| 2,975,588 | 3/1961 | Smith | 60/203.1 |
| 3,016,693 | 1/1962 | Jack et al. | 60/35.5 |
| 3,042,830 | 7/1962 | Orbach | 219/121.49 |
| 3,294,953 | 12/1966 | Spies, Jr. | 313/231.41 |
| 3,297,899 | 1/1967 | Pratt et al. | 313/231.41 |
| 3,298,179 | 1/1967 | Maes | 60/202 |
| 3,309,873 | 3/1967 | Cann et al. | 60/203 |
| 3,425,223 | 2/1969 | Browning | 60/203.1 |
| 3,692,431 | 9/1972 | Gebel | 417/183 |
| 4,548,033 | 10/1985 | Cann | 60/203.1 |
| 4,577,461 | 3/1986 | Cann | 60/203.1 |
| 4,800,716 | 1/1989 | Smith et al. | 60/203.1 |
| 4,805,400 | 2/1989 | Knowles | 60/203.1 |
| 4,866,929 | 9/1989 | Knowles et al. | 60/202 |
| 4,882,465 | 11/1989 | Smith et al. | 219/121.48 |
| 4,907,407 | 3/1990 | Simon et al. | 60/203.1 |
| 4,926,632 | 5/1990 | Smith et al. | 60/203.1 |
| 4,995,231 | 2/1991 | Smith et al. | 60/203.1 |
| 5,019,752 | 5/1991 | Schumacher | 313/231.41 |
| 5,063,324 | 11/1991 | Grunwald | 313/632 |
| 5,076,051 | 12/1991 | Naff | 60/203.1 |
| 5,111,656 | 5/1992 | Simon et al. | 60/203.1 |
| 5,267,584 | 12/1993 | Smith | 60/203.1 |
| 5,319,926 | 6/1994 | Steenborg | 60/203.1 |
| 5,519,991 | 5/1996 | Butler | 60/203.1 |

*Primary Examiner*—Timothy Thorpe
*Assistant Examiner*—Ted Kim

[57] ABSTRACT

A gas ionizable to produce a plasma is introduced into an arcjet whose design includes integration of performance enhancing components in a complimentary manner to significantly improve arcjet performance and capabilities. Major integrated design features include an energy recovery chamber, heat exchanger and by-pass gas flow system which enable the integrated arcjet to operate with minimal frozen flow energy losses, high specific powers and very high thrust levels.

21 Claims, 7 Drawing Sheets

INTEGRATED ARCJET HAVING A HEAT EXCHANGER AND SUPERSONIC ENERGY RECOVERY CHAMBER

This invention was made with U.S. Government support under Contracts Nos. F29601-91-C-0034 and F29601-92-C-0067 awarded by the U.S. Air Force. The U.S. Government has certain rights in this invention.

BACKGROUND OF THE INVENTION

This invention generally relates to electrothermal devices which produce an energetic plume. Specifically, an arcjet is disclosed which incorporates any one of several different design features for improved performance. The energetic plume from this type of arcjet can be used to provide thrust in space applications where the arcjet is part of a propulsion system for spacecraft attitude and orbit maintenance and repositioning functions. Similarly, the energetic plume from this type of arcjet can be used for a variety of ground based materials processing purposes.

Arcjets are known. Gas is heated to very high temperatures in an arcjet by heat transfer from a high power density electric arc. Expansion of this gas through a nozzle converts the heat energy in the gas to directed kinetic energy. The energetic arcjet plume can be made to perform useful work by providing thrust in a spacecraft propulsion application, or as a means of energy addition in numerous ground based materials processing applications. For a perspective of methods that have been employed to enhance the operation of arcjets, attention is directed to U.S. Pat. No. 3,016,693 to J. Ro Jack et al., U.S. Pat. No. 3,309,873 to G. L. Cann, U.S. Pat. No. 3,692,431 to R. Gebel, U.S. Pat. Nos. 4,548,033 and 4,577,461 to G. L. Cann, U.S. Pat. No. 4,800,716 to W. W. Smith et al., U.S. Pat. No. 4,805,400 to S. C. Knowles, U.S. Pat. No. 4,882,465 to W. W. Smith et al., U.S. Pat. No. 4,866,929 to S. Knowles et al., U.S. Pat. No. 4,907,407 to M. A. Simon et al., U.S. Pat. Nos. 4,926,632 and 4,995,231 to R. D. Smith et al., U.S. Pat. No. 5,111,656 to M. A. Simon et al., and U.S. Pat. No. 5,319,926 to M. Steenborg.

The prior art arcjet designs and their various embodiments have been intended to improve arcjet performance by better transfer of the arc energy to the flowing propellant gas. However, often times these prior art embodiments have proven to be ineffective in acting in a cumulative manner to significantly improve the overall arcjet performance. The net result is that substantial, across the board, arcjet performance gains have remained an elusive goal.

SUMMARY OF THE INVENTION

The present invention provides design enhancements to the known arcjet basic design and operating principle which, when integrated together, work in a complimentary manner to significantly improve arcjet performance and capabilities.

One feature of the integrated arcjet relates to the use of an energy recovery chamber to more efficiently transfer energy from the arc to the gas and to reduce the arc attachment power density on the arcjet nozzle materials.

A further feature of the present invention is to enable arcjet operation at higher specific powers by a heat exchanger which enables higher input powers to critical arcjet anode locations before materials limits are reached.

Still another feature is integration of the energy recovery chamber and heat exchanger into a single anode component which also comprises the propellant injectors, the converging nozzle section, the constrictor (or throat), and the diverging nozzle section.

Yet another feature of the present invention is thrust boosting by allowing provision within the arcjet for two separate gas flow paths where one gas flow path ultimately goes through the constrictor while the other flow path is by-passed around the outside of the constrictor and energy recovery chamber to be re-injected into the diverging nozzle section through embedded micro-nozzles.

An additional feature is thermal and mechanical isolation of the combined constrictor, energy recovery chamber and heat exchanger from the arcjet body to minimize radial temperature gradients and thereby mitigate thermal stress induced materials growth which would otherwise cause closure of the constrictor opening.

Still another feature is mechanical isolation of the arcjet anode component from the arcjet body tubes to allow for axial thermal expansion between the anode and arcjet body without mechanical stress and materials failure.

A further feature is the use of shaped arcjet cathodes to remove gas flow irregularities and to enhance heat transfer from the hot cathodes to the flowing gas, and to enhance electron emission from the cathodes, and thereby further enhance arcjet thermal efficiency and performance.

Another feature is the use of thermal insulation around the outer arcjet body to reduce arcjet body radiative heat loss and thereby further increase the heat exchanger temperature and its effectiveness in transferring heat energy to the flowing gas and to thereby further enhance arcjet performance.

Yet another feature is to enhance arcjet thermal efficiency by dividing the arcjet into heat recovery zones by using thin, concentric tubular sections in the arcjet body design.

An additional feature is use of a non-circular constrictor to alter the surface-to-volume ratio of the arc column passing through the constrictor and thereby increase arcjet performance by increasing heat transfer to the arc, increasing the gas flow path length, and increasing the residence time of the gas flow in the vicinity of the arc.

A further feature is a converging nozzle section shaped conformally with the cathode tip region to remove disturbances from the swirling gas flow to allow greater arc column stability, longer arc column length, more uniform arc column and gas mixing, and greater arc voltages.

These and other advantages and attainments of the present invention will become apparent to those skilled in the art upon a reading of the following detailed description when taken in conjunction with the drawings wherein is shown and described an illustrated embodiment of the invention.

DETAILED DESCRIPTION OF THE PREFERRED EMBODIMENTS

Figure 1:
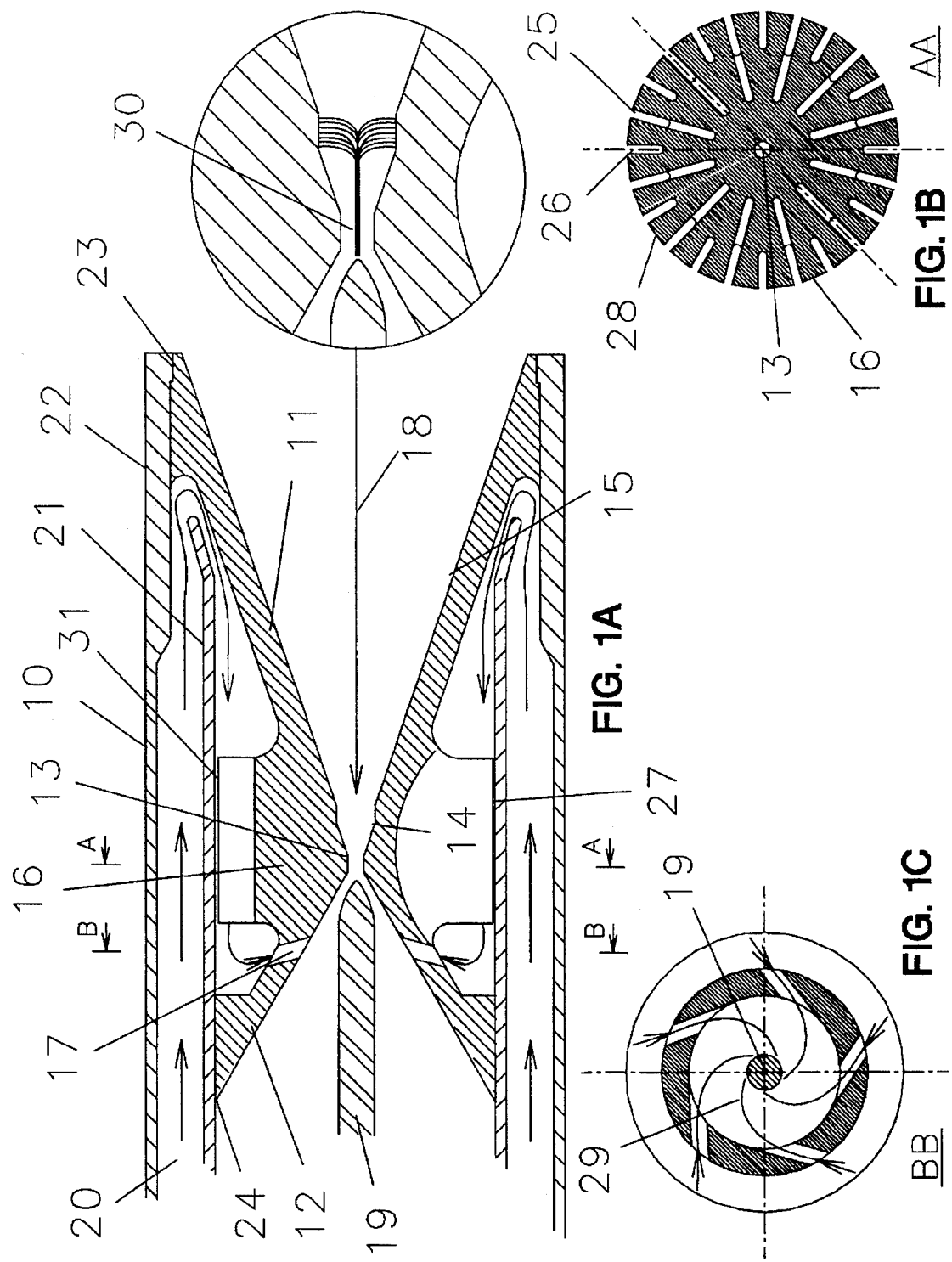
FIG. 1A is a cross-sectional view of an integrated arcjet representing one embodiment of the present invention.
FIG. 1B is a cross-sectional view of the heat exchanger of the integrated arcjet in FIG. 1A.
FIG. 1C is a cross-sectional view of the propellant injector of the integrated arcjet in FIG. 1C.

Referring to FIG. 1A, an integrated arcjet 10 according to the present invention consists of an anode 11 which comprises a converging nozzle section 12, a constrictor 13, an energy recovery chamber 14, a diverging nozzle section 15, a heat exchanger 16, and a propellant injector 17. Anode 11 is symmetrical about a central axis 18. Coaxially aligned and separated upstream of the constrictor 13 is a cathode 19 of generally cylindrical shape. A gas flow 20 is fed from the upstream, or rear, of the integrated arcjet 10 passing through thin inner 21 and outer 22 arcjet body tubes, reversing direction at the downstream end of the diverging nozzle section 15, passing through the heat exchanger 16 and entering the propellant injectors 17.

The anode 11 in FIG. 1A is manufactured from a high melting temperature, high thermal conductivity refractory material of high electrical conductivity. The inner 21 and outer 22 arcjet body tubes are also manufactured from a high melting temperature refractory material of high electrical conductivity and have thin walled sections to prevent substantial thermal conduction upstream, towards the arcjet rear. A gas tight joint 23 connects the downstream end of the anode 11 to the arcjet outer body tube 22. The upstream end 24 of the anode 11 is slip fit into the arcjet inner body tube 21 to permit differential axial thermal expansion between these components while maintaining a substantially gas tight joint.

FIG. 1B is a section view of the heat exchanger 16 integral to the anode 11. The gas flow 20 passes through the heat exchanger 16 which comprises a multiplicity of axially oriented radial slots 25, 26 evenly distributed around the arcjet 10 central axis 18. Because the integrated arcjet 10, the anode 11, and the heat exchanger 16, are coaxial, the gas flow 20 passes through the heat exchanger 16, in an evenly distributed manner. The outer surface of the heat exchanger 16 is isolated from the arcjet inner body tube 21 by a gap 27 which truncates the radial heat conduction path from the constrictor 13 to the inner arcjet body tube 21. Upon passing through the heat exchanger 16, the gas flow 20 enters the propellant injector 17 integral to the anode 11. FIG. 1C shows how the propellant injector 17 imparts a swirl 29 to the gas flow 20 around the cathode 19. The swirl 29 of the gas flow 20 is used to vortex stabilize the arc column 30.

Figure 2:
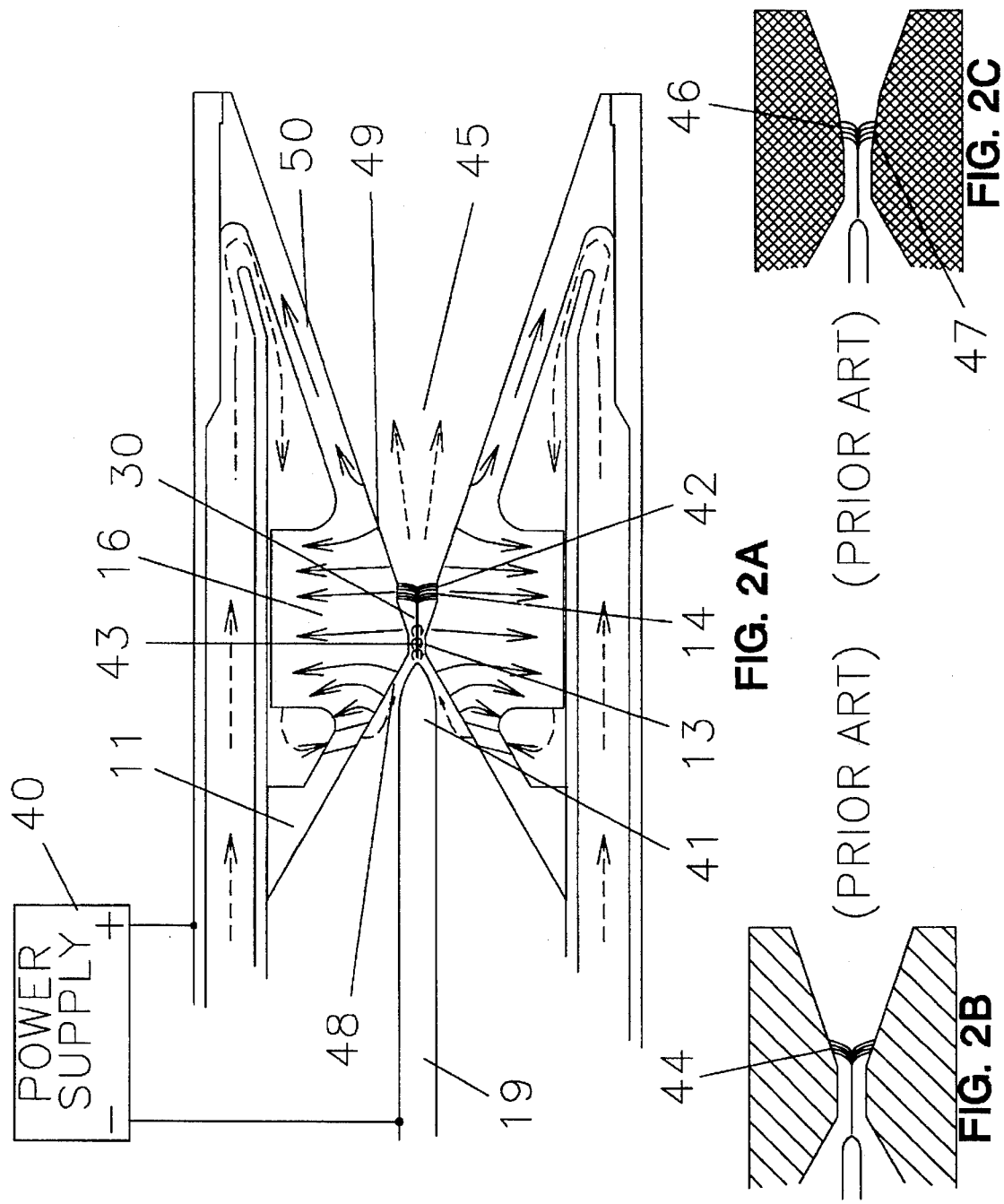
FIG. 2A is a schematic section view of the integrated arcjet in FIG. 1A showing the heat flow paths, the gas flow paths and the electrical energizing circuitry.
FIG. 2B is a section view of a prior art arcjet cathode and anode nozzle.
FIG. 2C is a section view of yet another prior art cathode and anode nozzle.

FIG. 2A shows schematically the electrical input power connections, gas flow path, and significant heat flow paths in the integrated arcjet 10. A power supply 40 provides an electrical potential between the anode 11 and the cathode 19 to produce an arc 30 between the tip of the cathode 41 and the interior surface 42 of the energy recovery chamber 14. The swirl 29 imparted to the gas flow 20 creates a vortex 43 which has a reduced density, or pressure, along the central axis 18 which stabilizes the arc 30 into a thin column as it passes through the constrictor 13. Significant heat transfer occurs between the arc column 30 and the gas vortex 43 which results in substantial heating of the gas flow 20. Techniques for properly sequencing the voltage and current from the power supply 40, and the gas flow 20, to establish and maintain the arc 30 are known. Also known are techniques to swirl 29 the gas flow 20 to establish a vortex 43 to stabilize the arc 30 into a long, thin column.

It is well known that a significant fraction of the energy deposited in the gas flow 20 from the arc column 30 is present in dissociation and ionization modes of the gas. Recombination and deionization processes occur slowly compared to the time for passage of the gas flow 20 through the constrictor 13. Thus, when the gas flow exits the constrictor 13 only a portion of the arc column 30 energy has been transferred to the gas flow 20 in the form of kinetic energy, suitable for useful work, while a significant fraction of the arc column 30 energy has been transferred to the gas flow 20 in the form of gas dissociation and ionization energy modes which do not add to the kinetic energy of the arcjet plume. These dissociation and ionization energy modes are referred to as frozen flow losses and unless recovered severely limit the efficiency of the arcjet. It is well known that recovery of these frozen flow losses can, in principal, be effected by maintaining the gas flow 20 in a high pressure environment to thereby increase the time for recombination and deionization processes to occur. In conventional arcjet designs the arc column 30 attaches to the region downstream of the constrictor 13 in the initial diverging section of the nozzle 44 as shown in FIG. 2B. The pressure of the gas flow 20 in this location is low and little recovery of frozen flow energy losses occurs. An approach to provide a higher pressure region for promoting partial frozen flow energy loss recovery is the use of an intermediate divergent nozzle region 46 as shown in FIG. 2C. However, this technique results in arc attachment to a relatively small surface area 47 which significantly increases power loading and thus, thermal loading, in this region. This problem is further exacerbated by the higher arc voltage of this approach due to the longer arc column length which further increases the thermal loading at the reduced area arc attachment location 47.

The energy recovery chamber 14 recovers a large fraction of the frozen flow losses of the gas flow 20. As shown in FIG. 2A, the gas flow 20 and arc column 30 are allowed to expand rapidly into a chamber whose cross sectional area is essentially constant and substantially larger than the cross sectional area of the constrictor 13. Arc column 30 attachment occurs over a large area 42 on the constant cross section energy recovery chamber 14. The gas flow 20 partially expands upon entering the energy recovery chamber 14 whereupon further gas expansion is halted and the pressure is stabilized. This abrupt pressure change causes the arc column to flare out, and for arc attachment to occur over the relatively large and well defined area of the energy recovery chamber 14 constant section area 42. The net result is that the arc attachment power density is spread over a much larger surface area than the more conventional arc attachment schemes of FIG. 2B and FIG. 2C. Moreover, the relatively high pressure in the constant section energy recovery chamber volume 14 results in substantial recovery of frozen flow energy losses due to the high pressure induced particle interactions. In addition to reducing frozen flow energy losses incurred during passage of the gas flow 20 through the constrictor 13, flaring the arc column in a relatively high pressure volume allows the energetic arc column 30 ions and electrons to further interact with the gas flow 20 in a highly collisional regime which further boosts energy addition to the gas flow 20. Furthermore, due to the much larger surface area for arc attachment 42 in the energy recovery chamber 14 compared to the arc attachment area 44 and 47 of conventional arcjet designs, a higher arc column power can be supported in the energy recovery chamber before thermal loading at the arc attachment area 42 results in a materials limit. Also, due to the fact that the arc column 30 is lengthened by forcing arc attachment to occur in the relatively constant pressure region of the energy recovery chamber 14, the arc voltage for a given input power is increased compared to prior art arcjets. Higher arc voltage is important since it means the integrated arcjet 10 operates at a substantially lower arc current at a given input power, which tends to increase arcjet lifetime by decreasing the electron current drawn from the cathode. Also, higher arcjet voltages decrease power distribution masses which is important for space propulsion applications of arcjets.

The energy recovery chamber 14 adds to the performance potential of the integrated arcjet 10 by recovering a large fraction of the frozen energy states created during passage of the gas flow 20 around the arc column 30. To further increase arcjet performance it is necessary to increase the amount of power being transferred to a given mass unit of gas flow 20. This parameter is commonly referred to as the arcjet specific power and has the units of MJ/kg. Larger arcjets can operate at higher input powers and also higher specific powers and thus large, high power arcjets achieve higher performance than small, low power arcjets. For a given arcjet size and fixed input power from the power supply 40, the specific power can be increased by gradually reducing the gas flow 20 mass flow rate. However, as the arcjet specific power is increased the temperature of the gas flow 20 in the arc column 30 stabilizing vortex 43 increases, which in turn increases the interior surface temperatures of the constrictor 13. It should be noted that the arc column 30 peak temperature is typically 10,000°–15,000° C. which is about 3–5 times the melting temperature of refractory materials common to the arcjet constrictor 13 and anode 11 components, and that it is only the vortex gas flow 43 which shields the constrictor 13 interior surfaces from the arc column 30 temperature.

The problem of attaining very high specific powers without incurring material thermal limits is solved in the integrated arcjet 10 by incorporation of a heat exchanger 16. In concept the heat exchanger 16 functions to stabilize the temperatures of the highest heat loading regions of the integrated arcjet 10 which are: the entrance to the constrictor 48 whose thermal loading comes primarily from the white hot tip 41 of the nearby cathode 19; the constrictor 13 whose thermal loading comes primarily from the extremely hot arc column 30; the energy recovery chamber 14 whose thermal loading comes primarily from the attachment of the arc column 30; and the initial portion of the divergent expansion nozzle 49 whose thermal loading comes from collisional processes occurring in the hot gas flow 20 as the kinetic energy of this gas flow 20 is ordered into a well directed plume 45. The heat exchanger 16 is designed to remove heat build-up from these aforementioned high heat loading regions as quickly as possible. This is accomplished by heat conduction along short, relatively low thermal impedance conduction paths from these high heat loading regions to axial slots 26 and 27 spaced evenly around the heat exchanger 16 body. The gas flow 20 passes through these slots and also over the peripheral surface area 28 of the heat exchanger 16 via the isolation gap 31. The summation of the surface area of the slots 26 and 27, and the peripheral surface area 28, results in a very large heat exchanger 16 net surface area which is exposed to the gas flow 20, thus increasing the transfer of heat energy from the constrictor 13 and the energy recovery chamber 14 to the gas flow 20, as it passes through the heat exchanger 16.

Mechanically and thermally isolating the heat exchanger 16 from the inner 21 and outer 22 arcjet body tubes via the isolation gap 31 effectively shields the peripheral surface 28 of the heat exchanger 16 from transferring heat radiatively to the environment surrounding the integrated arcjet 10. This isolation maintains the peripheral surface 28 of the heat exchanger 16 at a high temperature which results in a relatively low heat exchanger 16 temperature variation with radial distance outward from the central axis 18. With the heat exchanger 16 operating at a high, relatively uniform temperature, a higher heat flux is transferred to the flowing gas 20 which results in a greater heat removal rate from the high heat loading regions described above. Furthermore, with the heat exchanger operating at a high temperature, and low radial temperature gradient, there is little thermally induced radial mechanical stress which, in conventional arcjets, causes creep of the anode 11 material and gradual closure of the constrictor 13.

The highly efficient heat transfer characteristics of the heat exchanger 16, and the distributed arc attachment heat loading benefits of the energy recovery chamber 14, permit the integrated arcjet 10 to operate at higher specific powers than achievable with prior art arcjets. Moreover, the heat energy transferred to the gas flow 20 from the heat exchanger 16 increases the net energy of the gas flow 20 which in turn increases the overall thermal efficiency and performance of the integrated arcjet 10.

Figure 3:
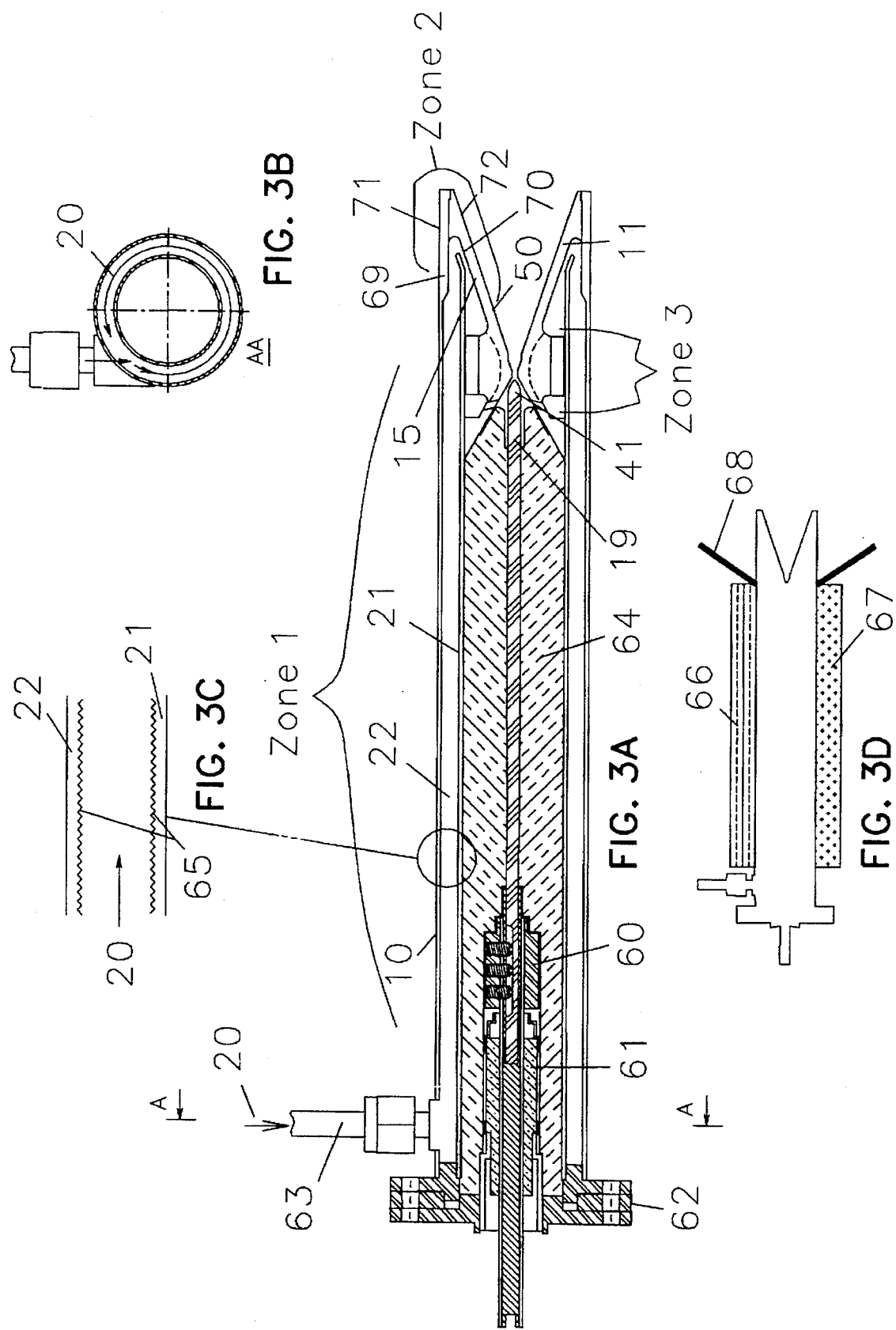
FIG. 3A is a complete cross-sectional view of the integrated arcjet in FIG. 3A showing the arrangement of the major integrated components.
FIG. 3B is a section view of the gas flow inlet arrangement of FIG. 3A showing how the gas flow enters the integrated arcjet to promote a swirl in the flow path.
FIG. 3C is a schematic of a portion of the arcjet body tube surfaces of FIG. 3A showing their surface texture to enhance heat transfer to the gas flow.
FIG. 3D is an outline schematic of FIG. 3A showing one embodiment of the integrated arcjet with thermal insulation around the outer arcjet body tube and a radiant heat energy shield near the downstream end of the integrated arcjet.

The integrated arcjet 10 thermal efficiency is maximized by transferring much of the integrated arcjet 10 heat energy to the gas flow 20. In addition to the heat energy transferred to the gas flow 20 from the heat exchanger 16, the integrated arcjet is separated into zones which simultaneously allow the gas flow 20 to limit the integrated arcjet 10 interior and exterior temperatures while allowing the gas flow 20 temperature to be progressively increased during its passage through the integrated arcjet 10 prior to entering the constrictor 13. FIG. 3A shows the gas flow zones within the integrated arcjet 10. In FIG. 3A, one specific embodiment of the integrated arcjet 10 is shown in a full assembly section drawing. The integrated arcjet 10 comprises a cathode holder 60, a hermetic cathode 19 and anode 11 electrical isolation insulator 61, a mating flange and metal ring pressure seal 62 for removal of the cathode 19, the cathode holder 60, and hermetic insulator 61 assembly from the integrated arcjet 10, a gas inlet connection 63, and a cathode 19 to arcjet anode 11 potential electrical insulator 64. It should be noted that the mating flange and metal ring pressure seal 62 are useful for ground testing and application of the integrated arcjet 10 for disassembly and servicing. However, for space propulsion applications of the integrated arcjet 10, the mating flange and ring pressure seal 62 can be replaced with a welded joint termination to the integrated arcjet 10 rear which reduces the mass and part complexity of the integrated arcjet 10. Ideally, the temperature at the rear of the integrated arcjet 10 in the mating flange 62 region should be of order 100 C to minimize thermal interface issues when using the integrated arcjet as part of a spacecraft propulsion system, or ground based materials processing system. Since the temperature of the downstream end of the diverging nozzle section 15 of the integrated arcjet 10 is of order 1,500 C, the use of thermal control zones in the integrated arcjet 10 is critical to achieving this integrated arcjet 10 rear temperature requirement.

The gas flow 20 is admitted into the integrated arcjet 10 in Zone 1 through the gas inlet 63 with a swirl velocity due to the tangential location of the gas inlet 63 on the periphery of the arcjet outer body tube 22 as noted in FIG. 3B. This gas flow 20 rotates around the arcjet central axis 18, between the inner 21 and outer 22 arcjet body tubes, in a direction generally towards the integrated arcjet 10 anode 11. Rotating the gas flow in Zone 1 significantly increases the path length the gas flow 20 between the inner 21 and outer 22 arcjet body tubes and the convective heat transfer to the gas flow 20 from interaction with the surfaces of these tubes. The efficiency of this convective heat transfer process is increased by machining the gas flow 20 exposed surfaces of the inner 21 and outer 22 arcjet body tubes with closely space grooves 65 as shown in FIG. 3C which simultaneously act to increase the turbulence of the gas flow 20 at the tube wall surfaces, and thus the convective heat transfer rate, and also to increase the effective inner 21 and outer 22 arcjet body tube surface area in contact with the gas flow 20 and thus also increase the net heat transferred to the gas flow 20.

The heat energy transferred to the gas flow 28 in Zone 1 is a result of heat conducted from the anode 11 along the inner 21 and outer 22 arcjet body tubes, and a result of heat conducted through the insulator 64 from the anode 11 and the cathode tip 41. The heat conducted along the inner 21 and outer 22 arcjet body tubes is minimized in the integrated arcjet by making these tubes very thin, with a typical wall thickness being 0.030" which is a compromise between minimizing the heat conduction path through these tubes while still retaining adequate tube strength. Such very thin wall inner 21 and outer 22 arcjet body tubes also results in a very light weight integrated arcjet 10 which is important for space propulsion applications. The heat conducted through the insulator 64 is minimized by using an insulator material which conducts heat better in the radial direction than in the axial direction. Use of such an insulating material results in heat conduction from the anode 11 and cathode tip 41 being directed to the inner 21 arcjet body tube where it can be efficiently convected to the gas flow 20.

Since an arcjet is essentially a form of plasma heat engine, techniques for reducing heat loss from the arcjet to the surrounding environment can result in further arcjet performance gains. The integrated arcjet can be configured to reduce the radiative heat energy loss from the outer 22 arcjet body tube in Zone 1 by insulating the length of the tube in this zone as shown in FIG. 3D. This insulation can be either multiple layers of thin, high temperature refractory metal foil 66 dimpled to eliminate foil layer-to-layer thermal radial heat conduction, or a low density, high temperature refractory fiber blanket 67. Addition of such radiative insulation to the integrated arcjet 10 virtually eliminates radiation heat loss along the length of Zone 1. Operating tests of an integrated arcjet with and without Zone 1 insulated in this manner show that, for a power supply 40 input to the integrated arcjet 10 of 8 kW, and using a hydrogen/nitrogen gas flow 20, the temperature of the mating flange 62 region remained essentially unchanged while the temperature of the downstream end of the nozzle section 15 increased by about 5% for the configuration with Zone 1 insulated. This result showed that while the axial temperature gradient along the length of the integrated arcjet 10 increased slightly with Zone 1 insulated, the temperature increase of the inner 21 and outer 22 arcjet body tubes permitted more heat to be convectively transferred to the gas flow 20 so that there was no temperature increase at the mating flange region 62 at the rear of the integrated arcjet 10. A final advantage to insulating Zone 1 on the integrated arcjet is that the principle radiative heat source is confined to the extreme downstream end of the integrated arcjet 10 at Zone 2 which acts like a point source of heat radiation and thus affords a relatively simple, small size and low mass means of shielding radiative heat energy from returning back toward any spacecraft surfaces during use of the integrated arcjet 10 for space propulsion applications.

The heat energy transferred to the gas flow 20 during its passage through Zone 1 increases the temperature of the gas flow 20. The gas flow 20 temperature is further increased during passage through Zone 2. Zone 2 maintains the overall temperature balance of the integrated arcjet 10, since with Zone 1 insulated 66, 67, heat can only escape the integrated arcjet from the surfaces of Zone 2 which are exposed to the environment surrounding the integrated arcjet 10. As described above, simple radiative heat energy shields 68 can be used at the interface between Zone 1 and Zone 2 to ensure that heat radiation from Zone 2 is emitted with a generally hemispherical distribution centered around the central axis 18, and directed generally downstream of the integrated arcjet 10. In passage through Zone 2, the gas flow undergoes an approximate 180 degree direction change during which time the gas flow 20 is heated by convective heat transfer with the inside surface 69 of the thickened tip of the outer 22 arcjet body tube and the outer surface 70 of the divergent section of the arcjet nozzle 15. The heat transferred convectively to the gas flow 20 in Zone 2 originates as excess heat energy from the heat exchanger 16 which is allowed to conduct away from the heat exchanger 16 along the divergent nozzle 15 heat conduction path 50. The divergent nozzle 15 heat conduction path 50 has a relatively thin section to maintain a relatively high heat exchanger 16 average temperature while also permitting enough heat transfer in Zone 2 to enable a stable heat energy inflow and outflow balance during operation of the integrated arcjet 10. Also, the relatively thin section of the divergent nozzle 15 heat conduction path 50 reduces the mass of the anode 11 and thus lowers the overall integrated arcjet 10 mass.

Thickening the outer 22 arcjet body tube section in Zone 2 allows conduction heat flow changes along the divergent nozzle 15 heat conduction path 50, resulting from power supply 40 input power changes to the integrated arcjet 10, to be rapidly distributed along the outer surface 71 of this thickened region and also the inner surface 72 of the divergent nozzle region 15. Since heat energy radiates from these surfaces in proportion to the fourth power of the surface temperature, large fluctuations of integrated arcjet 10 input power from the power supply 40 result in only relatively small changes in surface temperature. Further enhancement of the radiative heat exchange from the surfaces 71 and 72 to the surrounding arcjet environment can be accomplished by coating these surfaces with a high emissivity refractory coating and also by texturing these surfaces to increase their intrinsic emissivity.

As described above, the final gas flow 20 heat energy addition process prior to the gas flow 20 entering the constrictor 13 occurs in Zone 3 which is the heat exchanger 16. The summation of the different means of integrated arcjet 10 temperature control, and of heat energy transfer to the gas flow 20 in Zones 1, 2 and 3 and the previously discussed energy recovery chamber 14 operating principles, results in high integrated arcjet 10 performance. One embodiment of the integrated arcjet 10 has achieved a specific impulse of 1,296 sec. at an efficiency of 43.6% with hydrogen propellant at an input power of 5.16 kW. At twice this power level on hydrogen, a prior art arcjet as represented by FIG. 2B achieves a specific impulse of 1,030 sec. at an efficiency of 34.5%, while a prior art arcjet as represented by FIG. 2C achieves a specific impulse of 1,100 sec. at an efficiency of 39.0%. These data are particularly noteworthy since the prior art arcjets were operating at higher input powers which automatically elevates both arcjet specific impulse and efficiency. Demonstration of the overall cumulative thermal efficiency gains of the integrated arcjet 10 are also verified by the specific power of the integrated arcjet 10 which at the above hydrogen gas flow 20 operating condition operated without measurable erosion at a specific power of 184 MJ/kg as compared to a value of 150 MJ/kg for the prior art arcjet of FIG. 2a and the prior art arcjet of FIG. 2B. Similar gains in performance of the integrated arcjet 10 over all prior art arcjet designs have been demonstrated for all power levels tested which have included operation from 1.5 KW to 15.0 kW, and for gas flows 20 other than hydrogen, which have included operation on ammonia and hydrazine gas flows 20.

Figure 4:
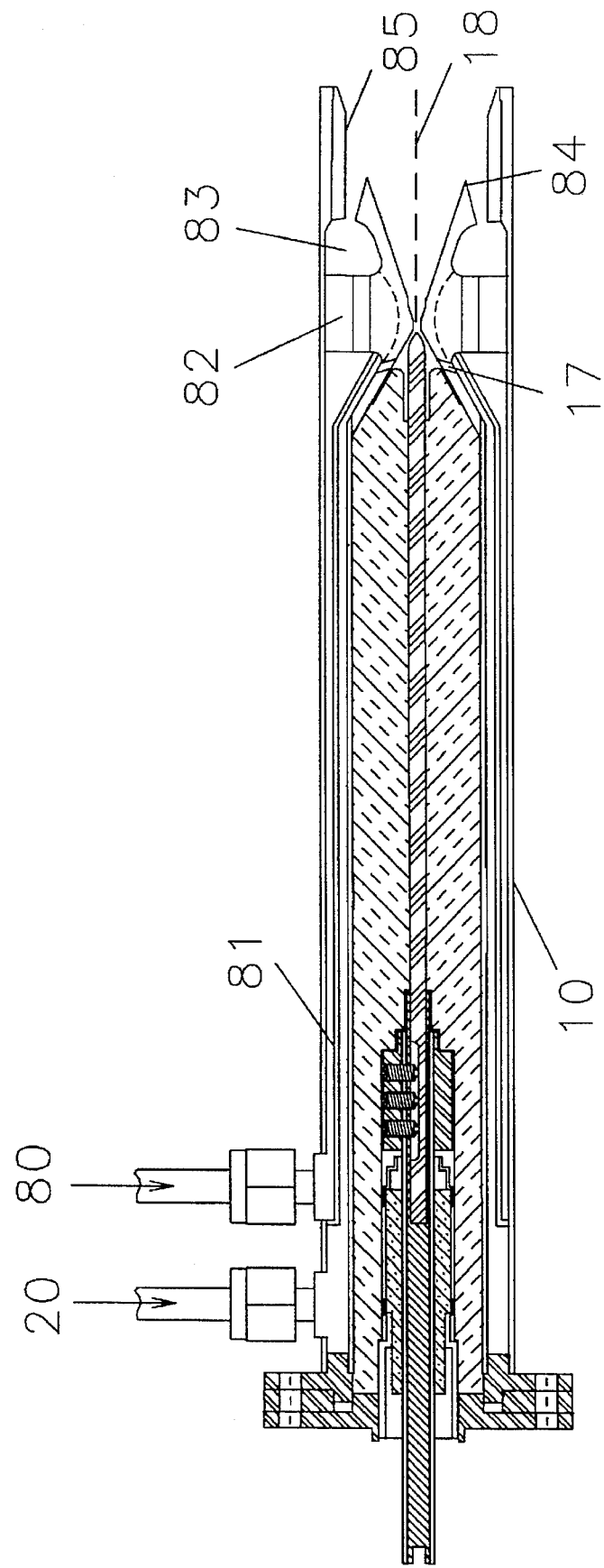
FIG. 4 is a cross-sectional view of another embodiment of the invention showing an integrated arcjet with both gas flow and by-pass gas flow.
Figure 5A:
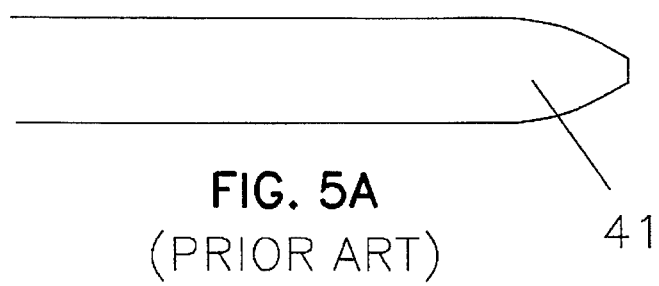
FIG. 5A is an outline of the tip region of a prior art cathode.

Still a further embodiment of the integrated arcjet 10 is shown in FIG. 4. In FIG. 4 the integrated arcjet 10 has been configured to include a by-pass gas flow 80 in addition to the gas flow 20 to boost the thrust of the integrated arcjet 10. In operation, the gas flow 20 passes between the inner 21 and middle 81 arcjet body tubes to the propellant injector 17 to sustain and vortex stabilize the arc column 30 without passing through the heat exchanger 16. Simultaneously, the by-pass gas flow passes between the middle 81 and outer 22 arcjet body tubes, passes through an enlarged heat exchanger 82 to a plenum 83 where it is injected supersonically into the integrated arcjet 10 divergent nozzle section through a series of micro-nozzles embedded into, and evenly spaced around the central axis 18 of, the integrated arcjet 10. Since the by-pass gas flow 80 does not interact with the arc column 30 to become ionized, the heat energy transferred to the by-pass gas flow 80 from the heat exchanger 16 heats the gas without incurring frozen flow energy losses. Although the by-pass gas flow 80 temperature cannot exceed the materials temperature limits of the heat exchanger 16, plenum 83 and micro-nozzles 83, the efficiency of this heat transfer process is very high and can be of order 85%–90%. As a consequence, the performance of the integrated arcjet 10 in the embodiment shown in FIG. 5A is a combination of the contribution of the high thrust, high efficiency, and relatively low specific impulse of the by-pass gas flow 80 and the contribution of the lower thrust and efficiency, but much higher specific impulse of the gas flow 20. Thus, for a fixed input power from the power supply 48, the integrated arcjet embodiment of FIG. 4 can be made to function with relatively high specific impulse, and moderate efficiency and thrust, using only the gas flow 20. However, by adding increasing amounts of by-pass gas flow 80, the thrust can be made to increase significantly, with gradually increasing efficiency, and with a gradual decline in specific impulse. Arcjets have been fabricated similar to the embodiment shown in FIG. 4 using four micro-nozzles embedded in the diverging nozzle section 15 of the anode 11. For one such integrated arcjet 10 operating on a nitrogen/hydrogen gas mixture at an input power of 5.6 kW, comparing performance between arcjet operation with gas flow 20 passing through the constrictor 13 only, and with a by-pass gas flow 80 equal to the gas flow 20 passing through the constrictor 13, the thrust increased by a factor of 1.58, the efficiency increased by a factor of 1.17, and the specific impulse decreased by 20.5%. Moreover, this same integrated arcjet 10 operated at a virtually constant arc voltage of 163 V (while the arc current was regulated by the power supply 40 at a fixed value of 35 A), as the by-pass gas flow 80 was steadily increased from a zero value to a value which was equal to the gas flow 20 passing through the constrictor 13. A constant arc voltage characteristic is very important for space propulsion thrust boosting applications of the integrated arcjet 10 since it means that significant thrust boosting can be performed using the by-pass gas flow 80 technique without increasing the arc voltage requirement, and thus the input power requirement, for the integrated arcjet 10.

Figure 5B:
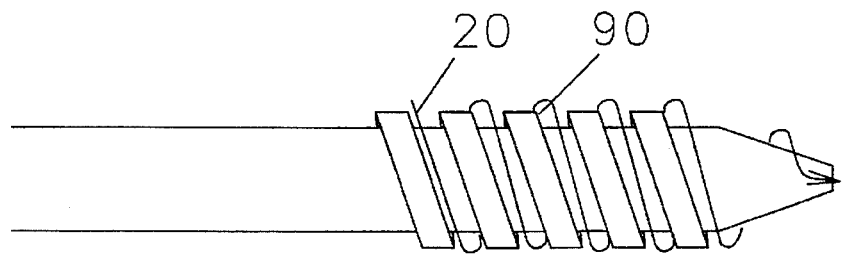
FIG. 5B is an outline of the tip region of a shaped cathode having helix grooves.
Figure 5C:
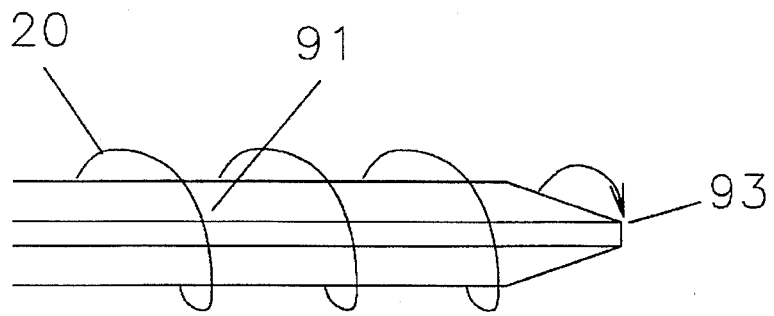
FIG. 5C is an outline of the tip region of a shaped cathode having axial grooves.
Figure 5D:
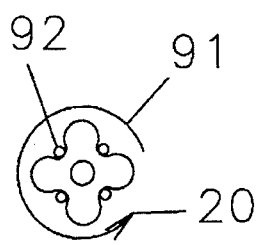
FIG. 5D is a cross sectional view of FIG. 5C.

Still further performance gains in the integrated arcjet 10 can be realized by shaping the tip 41 of the cathode 19. FIG. 5A shows a cathode 19 whose tip region 41 has been shaped into a rounded contour to eliminate disturbances in the gas flow 20 as it swirls around the cathode and to thereby preserve the swirl 29 for arc column 30 vortex stabilization 43. FIG. 5B and FIG. 5C show two further modifications to the cathode tip 41 to enhance cathode 19 operation and integrated arcjet 10 performance. The cathode tip 41 design in FIG. 5B has a single helix 90, or multiple helix grooves, machined into its generally cylindrical form. The gas flow 20 swirl 29 imparted by the propellant injector 17 is further strengthened and maintained by the gas flow 20 being forced to follow the helix 90 which is machined to ensure a common direction of swirl 29. Strengthening and prolonging the gas flow 20 swirl with the cathode tip 41 helix 90 increases the axial dimensional stability of the arc column 30, which enables lower gas flows 20 to be used in the integrated arcjet 10 for a given power supply 40 power level, which enables higher specific power operation of the integrated arcjet 10, which further increases integrated arcjet 10 performance. In addition, the helix 90 effectively increases the surface area of the cathode tip 41 which results in a greater amount of convective heat transfer from the cathode tip 41 (which typically has a temperature of 2,500–3,000 C.), to the gas flow 20. This additional heat energy input to the gas flow 20 further increases integrated arcjet 10 performance and also reduces cathode tip 41 erosion by enhancing heat removal from this electron emission site. Reducing cathode tip 41 erosion increases the integrated arcjet 10 lifetime and maintains more constant arcjet operation during this lifetime since any cathode tip 41 erosion increases the length of the arc column 30 which increases the required arc voltage from the power supply 40.

The cathode tip 41 design in FIG. 5C has axial slots 91 machined along its length. These axial slots 91 are evenly spaced around the circumference of the cathode tip 41 as shown in the section view in FIG. 5C. The gas flow 20 swirling around the cathode tip from the propellant injector 17 tends to stagnate 92 in these axial slots 91 which creates a high gas, and high plasma density within the region of the axial slots closest to the usual electron emitting portion 93 of the cathode tip 41. The high plasma density in these axial slots 91 makes the slots function as hollow cathodes with electron emission occurring from the surfaces of the axial slots 91 aided by the high plasma density in the axial slots 91 which, due to the plasma sheath voltage gradient, effectively lowers the electronic work function of the axial slot surfaces due to the Schottky effect. The net result is that electron emission from the hollow cathode action of the axial slots 91 adds to the electron emission occurring from the usual electron emitting portion 93 of the cathode tip 41. This combined electron emission process reduces cathode tip 41 temperatures which reduces cathode tip 41 erosion and increases the lifetime of the integrated arcjet 10 as well as maintaining more constant integrated arcjet 10 operation during this lifetime.

Figure 6A:
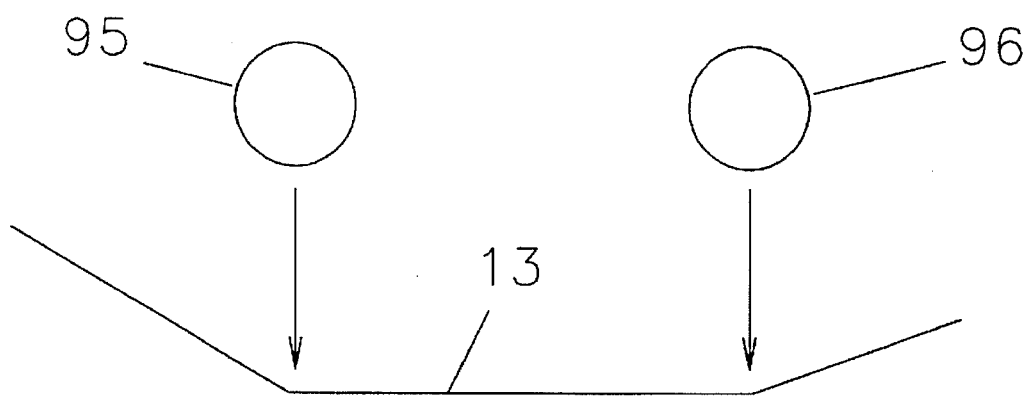
FIG. 6A is an outline of a prior art constrictor with circular cross section.
Figure 6B:
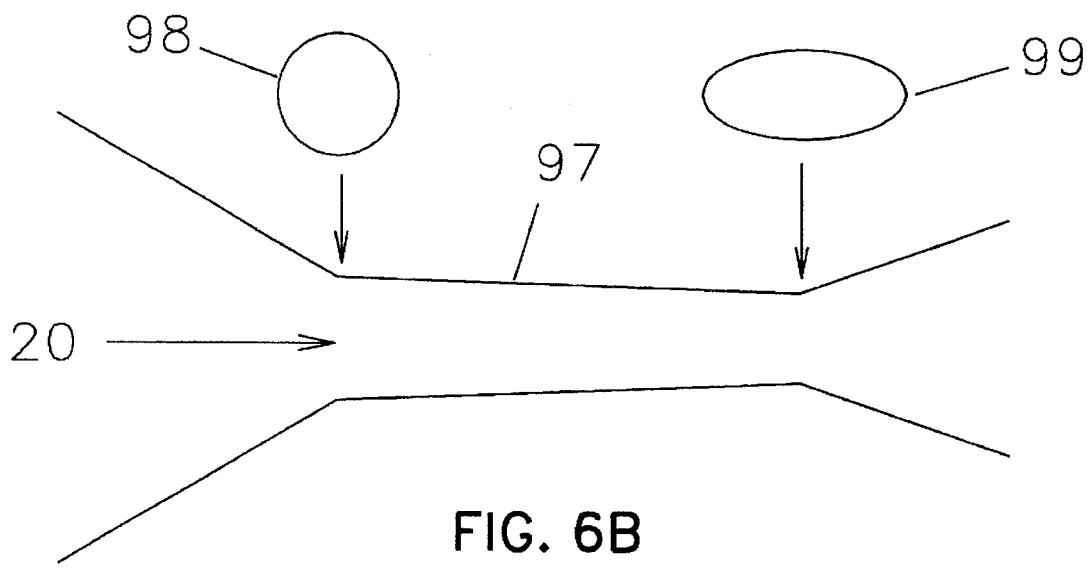
FIG. 6B is an outline of one embodiment of a non-circular cross section constrictor with a circular cross section entrance and an elliptical cross section exit.

Another means of further increasing performance of the integrated arcjet 10 is by the use of constrictor 13 cross section changes. FIG. 6A shows a prior art constrictor 13 which has a cylindrical geometry which usually has the same entrance circular diameter 95 as the exit circular diameter 96. FIG. 5B shows a non-circular constrictor 97 which has a circular entrance 98 cross section and an elliptical exit 99 cross section. The areas of these cross sections are approximately the same so that the cross section of the non-circular constrictor 97 tapers from the circular entrance 98 to the elliptical exit 99 in the section view of the non-circular constrictor 97 shown in FIG. 5B. As the arc column 30 travels from the circular entrance 98 to the elliptical exit 99 of the non-circular constrictor 97, the arc column flares out along the major axis direction of the increasingly elliptical non-circular constrictor 97 cross section. This flaring results in a longer path for the gas flow 20 as it circulates around the periphery of the arc column 30, which results in a longer residence time for the gas flow 20 adjacent to the arc column 30 and increasing the mixing of the gas flow 20 with the arc column 30, which results in greater heat energy transfer from the arc column 30 to the gas flow 20, which results in higher integrated arcjet 10 performance.

Figure 7:
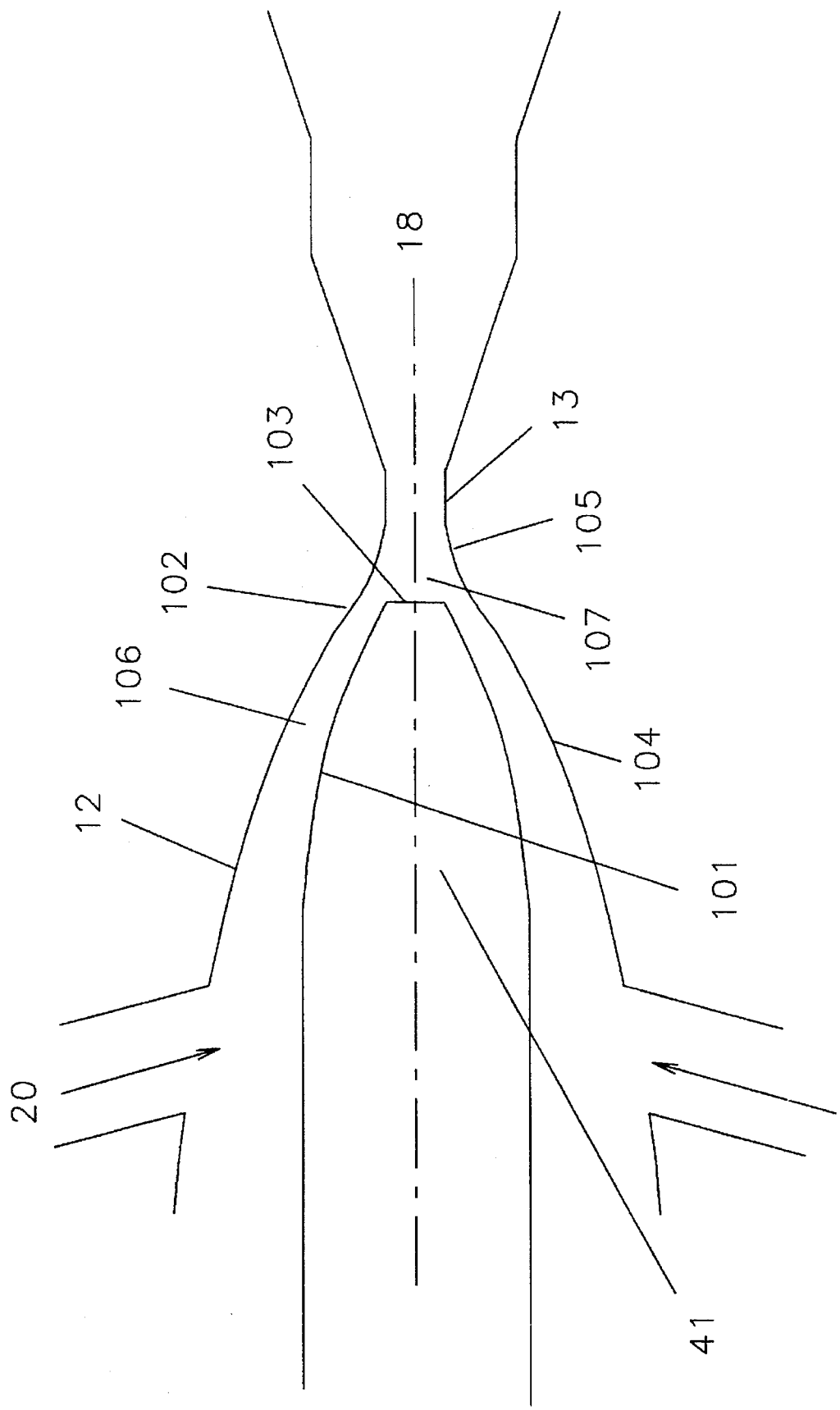
FIG. 7 is a section view of one embodiment of the converging nozzle section of the integrated arcjet in FIG. 1A.

Still a further means of increasing the performance of the integrated arcjet 10 is by the use of a shaped converging nozzle section 12. FIG. 7 shows a converging nozzle section 12 shaped to enhance the interaction of the gas flow 20 with the arc column 30. Prior art arcjet converging nozzle sections 12 use a conical diverging nozzle section 12. In FIG. 5A the converging nozzle section 12 has a smooth contour which follows the round cathode shaping 101 of the cathode tip region 41. Moreover, this contour has an inflection point 102 near the downstream end of the cathode 103 where the converging nozzle section 12 curvature changes from being concave 104 relative to the integrated arcjet 10 central axis 18, to being convex 105 relative to the integrated arcjet 10 central axis 18. The concave 104 converging nozzle section contour follows the round cathode shaping 101 such that the cross section of the annular area 106 between these contours continuously decreases as the gas flow moves to the converging nozzle contour inflection point 102. This smoothly decreasing annular area 106 helps to maintain the swirl 29 in the gas flow 20. Downstream of the converging nozzle contour inflection point 102, the gas flow 20 passes from an annular area passage 101 to a generally cylindrical passage 107. The convex 105 converging nozzle section contour smoothly transitions the gas flow from the annular area passage 106 to the cylindrical passage 107 whose cross sectional area is reduced by the convex 105 converging nozzle contour until this contour meets with the entrance to the constrictor 13. This smooth transitioning of the gas flow 20, and subsequent enhanced arc column 30 vortex stabilization 43, enables the downstream end of the cathode 103 to be placed farther upstream of the constrictor 13 and the arc column 30 to be lengthened. The net result of lengthening the arc column 30 is that the gas flow 20 interacts with the arc column 30 for a longer time period, with more arc column 30 energy being transferred to the gas flow 20 and higher integrated arcjet 10 performance.

Considerations for use of the integrated arcjet 10 and its embodiments for space propulsion applications or ground based materials processing applications are material selection for durability and mass savings. In general, the integrated arcjet can be manufactured using high temperature refractory metals and insulator materials common to prior art arcjets. However, highest performance will be attained using tungsten and its alloys for the anode 11, and the downstream end of the outer 22 arcjet body tube, with TZM molybdenum for the remainder of the outer 22 arcjet body tube and the inner 21 arcjet body tube. The insulator 64 can be made from hot pressed boron nitride whose anisotropic properties can be used to limit axial heat conduction and maximize radial heat conduction.

Although a particular embodiment of the invention has been described with some degree of specificity, it is understood that the present disclosure has been made by way of descriptive example and that the few alternatives that have been mentioned do not constitute the totality of the changes in the details of construction and arrangement of parts which may be resorted to by those skilled in the art without departing from the true spirit and scope of that which is patentable.

I claim:

1. An integrated arcjet comprising:
    an anode having a converging nozzle section, a constrictor, a diverging nozzle section, and a propellant injector, the anode being symmetrical about a central axis of the integrated arcjet;
    a cathode, the cathode being generally cylindrical in shape and positioned within an insulator, the cathode being coaxially aligned with the constrictor along the central axis of the integrated arcjet, the cathode including a tip region positioned within the converging nozzle section;
    means for introducing and controlling a gas, ionizable to produce a plasma, the gas flowing from a location generally at an upstream end of the integrated arcjet;
    inner and outer arcjet body tubes, coaxially assembled to include an annular gap therebetween and aligned along the central axis of the integrated arcjet;
    means for guiding the gas through the annular gap between the inner and the outer arcjet body tubes through the anode, the propellant injector, the converging nozzle section and the constrictor, the gas exiting the integrated arcjet at a supersonic velocity within an inside surface of the diverging nozzle section at a downstream end of the integrated arcjet;
    power supply means for providing a voltage potential to start and sustain a plasma discharge, the plasma discharge being pushed by the gas to thereby create an arc passing from the tip region of the cathode through the constrictor;
    means for creating a vortex in the flow of gas from the propellant injector to thereby stabilize an arc column and to simultaneously sink a high flux of heat energy from the arc column as it passes through the constrictor;

an energy recovery chamber, formed integrally with the anode and positioned between the constrictor and the divergent nozzle section, the energy recovery chamber serving to first permit rapid expansion of the gas and to then momentarily slow expansion of the gas;

means for adding integrated arcjet thermal energy to preheat the gas through a sequence of heat transfer zones comprising the inner and outer arcjet body tubes, a downstream tip of the outer arcjet body tube, and the diverging nozzle section; and a heat exchanger integrally formed with the anode to rapidly remove heat energy from the converging nozzle section, the constrictor, the energy recovery chamber, and an upstream portion of the diverging nozzle section.

2. An integrated arcjet as in claim 1, further comprising:

means for introducing a by-pass gas at a location generally at the upstream end of the integrated arcjet;

a middle arcjet body tube, the inner, middle, and outer arcjet body tubes being arranged to provide generally annular paths to substantially isolate flow of the gas and the by-pass gas;

means for restricting flow of the gas to an area between the inner and middle arcjet body tubes to thereby direct it to the propellant injector and through the converging nozzle section, through the constrictor and into the energy recovery chamber, and finally into the diverging nozzle section;

a plume integral to the anode and a multiplicity of micro-nozzles embedded into a periphery of the diverging nozzle section, each of the micronozzles including a throat area at least ten times smaller in area than a micronozzle exit area to ensure that the by-pass gas exits each of the micronozzles at a supersonic velocity;

means for restricting flow of the by-pass gas to an area between the middle and the outer arcjet body tubes to thereby direct it through the heat exchanger into the plenum and through the multiplicity of micronozzles, the velocity of the by-pass gas exiting the micronozzles being combined with the velocity of the gas exiting the constrictor and the energy recovery chamber in the divergent nozzle section; and means for independently controlling flow of the gas and the by-pass gas.

3. An integrated arcjet as in claim 2 wherein the heat exchanger is formed to be generally cylindrical in shape, the heat exchanger including a multiplicity of slots through which gas flows, the slots being equally spaced around a peripheral surface of the heat exchanger and extending along an axial length thereof, each of the slots having a width between 0.010 and 0.060 inches and having a depth greater than the width.

4. An integrated arcjet as in claim 3 wherein the peripheral surface of the heat exchanger is separated from the inner arcjet body tube by a gap of between 0.010 and 0.40 inches.

5. An integrated arcjet as in claim 2 wherein the means for introducing and controlling the gas and by-pass gas is operative for introducing the gas and by-pass gas through the outer arcjet body tube in a tangential orientation to the outer arcjet body so that the gas flows in a generally helical pattern within the annular gap between the inner and middle arcjet body tubes and the by-pass gas flows in a generally helical pattern within the annular gap between the middle and outer arcjet body tubes.

6. An integrated arcjet as in claim 2 wherein surfaces of the inner and middle arcjet body tubes, and middle and outer arcjet body tubes, adjacent the annular gap through which the gas flows are textured to provide a multiplicity of ridges of height less than 10% of a thickness of the inner and middle arcjet body tubes, and middle and outer arcjet body tubes.

7. An integrated arcjet as in claim 1, wherein:

the energy recovery chamber comprises a diverging cross section portion and a constant cross section portion, the diverging cross section portion having a cone half angle not less than a cone half angle of the diverging nozzle section, and not more than 3.0 times as great than the cone half angle of the diverging nozzle section, the constant cross section portion having an axial length not less than one-half of an axial length of the constrictor and not more than twice the axial length of the constrictor, the constant cross section portion having a diameter not less than 1.5 times a diameter of the constrictor and not more than 5.0 times the diameter of the constrictor.

8. An integrated arcjet as in claim 1 wherein the heat exchanger is formed to be generally cylindrical in shape, the heat exchanger including a multiplicity of slots through which gas flows, the slots being equally spaced around a peripheral surface of the heat exchanger and extending along an axial length thereof, each of the slots having a width between 0.010 and 0.060 inches and having a depth greater than the width.

9. An integrated arcjet as in claim 8 wherein the peripheral surface of the heat exchanger is separated from the inner arcjet body tube by a gap of between 0.010 and 0.40 inches.

10. An integrated arcjet as in claim 1 wherein the anode is attached at a downstream end thereof to the outer arcjet body tube, and upstream end of the anode being slip fitted into the inner arcjet body tube to permit axial thermal expansion between the anode and the inner arcjet body tube.

11. An integrated arcjet as in claim 10, further comprising a radiation heat shield attached to the outer arcjet body tube adjacent a downstream end of the thermal insulation means, the radiation heat shield being generally cone shaped with a cone half angle between 45 degrees and 89 degrees, the radiation heat shield diverging outwardly in a direction toward the downstream end of the integrated arcjet, an outside diameter of the radiation heat shield being between two and five times a diameter of the outer arcjet body tube.

12. An integrated arcjet as in claim 1, further comprising thermal insulation means positioned outside of the arcjet outer body tube from a point of introduction of the gas to a location at a downstream end of the heat exchanger.

13. An integrated arcjet as in claim 12 wherein the thermal insulation means comprises a multiplicity of layers of concentric wraps of a refractory metal foil.

14. An integrated arcjet as in claim 12 wherein the thermal insulation means comprises a vented refractory metal cylinder containing spun refractory ceramic fibers.

15. An integrated arcjet as in claim 1 wherein the means for introducing and controlling the gas is operative for introducing the gas through the outer arcjet body tube in a tangential orientation to the outer arcjet body so that the gas flows in a generally helical pattern within the annular gap between the inner and outer arcjet body tubes.

16. An integrated arcjet as in claim 1 wherein surfaces of the inner and outer arcjet body tubes adjacent the annular gap through which the gas flows are textured to provide a multiplicity of ridges of height less than 10% of a thickness of the inner and outer arcjet body tubes.

17. An integrated arcjet as in claim 1 wherein:

the tip region of the cathode is shaped to include between one and five helical paths and six evenly spaced axial slots.

18. An integrated arcjet as in claim 1 wherein:

the constrictor is formed to have an elliptical cross section;

an upstream constrictor entrance is circular; and a downstream constrictor exit is formed to have a generally elliptical cross section, the constrictor having a smooth transition shape from its entrance to its exit, the cross section area of the constrictor entrance being equal to or greater than the cross section area of the constrictor exit.

19. An integrated arcjet as in claim 1 wherein the diverging nozzle section between the heat exchanger and the tip of the outer arcjet body tube has a thickness chosen to minimize thermal conduction from the heat exchanger.

20. An integrated arcjet as in claim 1 wherein the insulator exhibits anisotropic heat conduction properties such that heat conducts upstream from the tip region of the cathode and a heat exchanger region of the anode at a substantially greater rate in a direction normal to the central axis of the integrated arcjet than in a direction parallel with the central axis of the integrated arcjet.

21. An integrated arcjet as in claim 1 wherein:

the converging nozzle section is shaped with a curved contour;

the curved contour is concave relative to the integrated arcjet central axis upstream of an inflection point;

the curved contour is convex relative to the integrated arcjet central axis downstream of the inflection point;

the inflection point is positioned proximate the tip region of the cathode;

the concave curved contour follows the curved contour of the cathode tip region;

the annular area between the concave curved contour and the cylindrical cathode contour decreases uniformly in the direction of the gas flow to the inflection point; and the convex curved countour begins at the inflection point and ends at a tangent to the entrance to the constrictor.

* * * * *